No. 668,330. Patented Feb. 19, 1901.
E. HANCOX.
PIPE MAKING MACHINE.
(Application filed Sept. 22, 1900.)
(No Model.) 6 Sheets—Sheet 1.
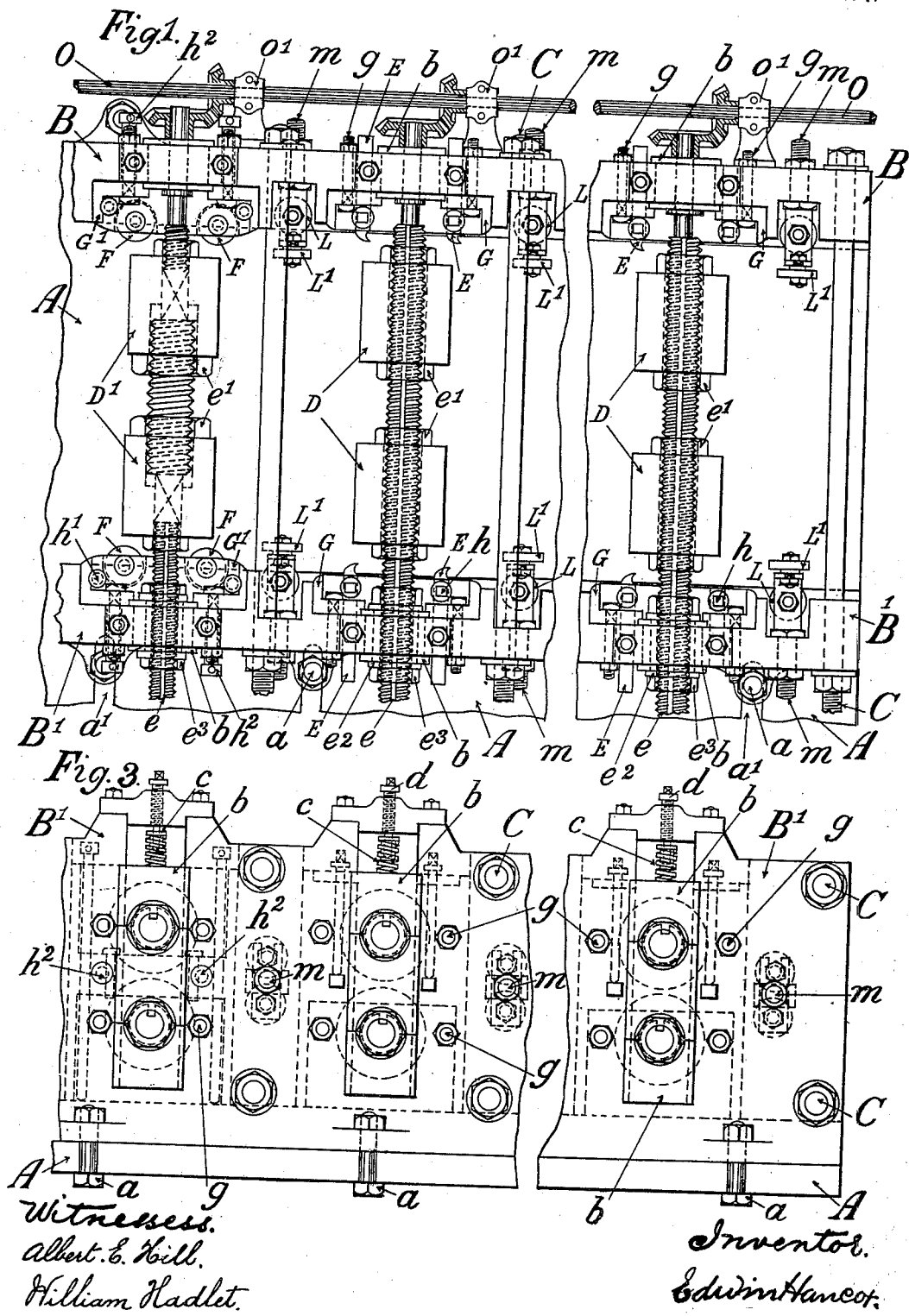
Witnesses.
Albert E. Hill.
William Hadlet.
Inventor.
Edwin Hancox.

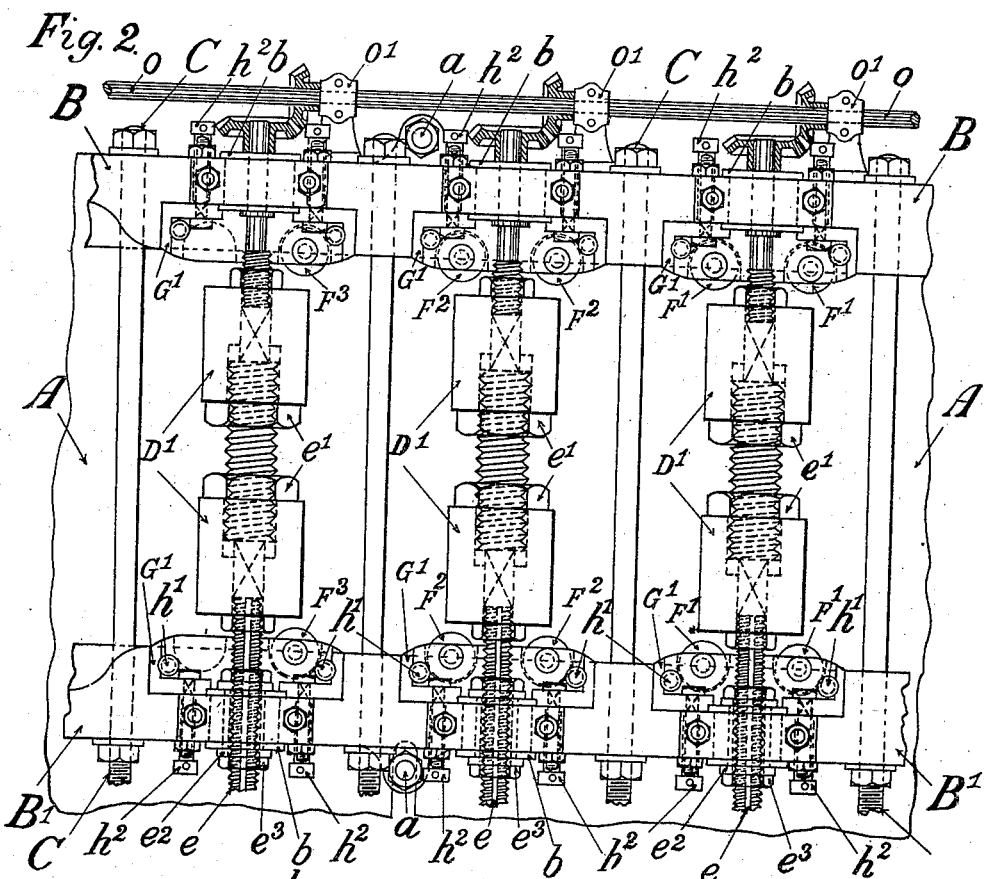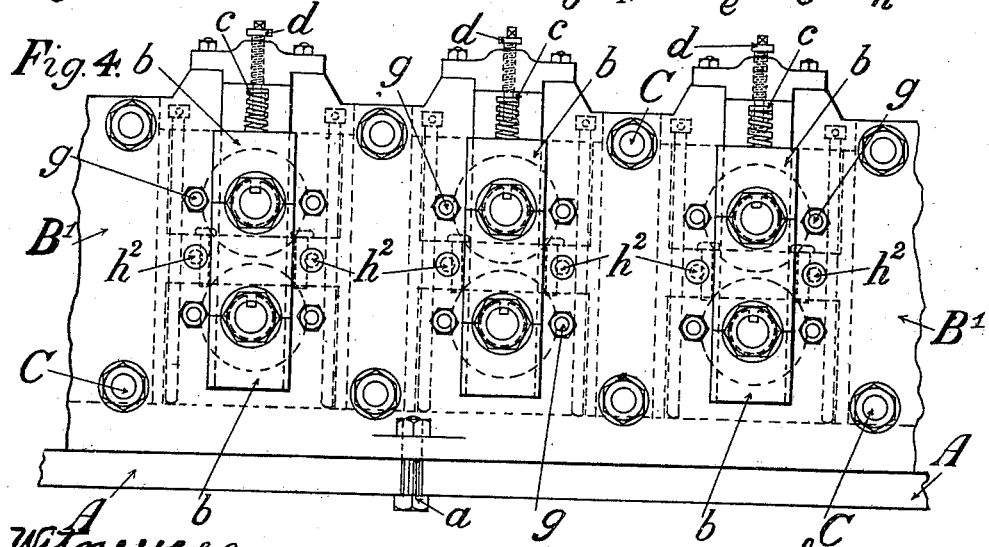

No. 668,330. Patented Feb. 19, 1901.
E. HANCOX.
PIPE MAKING MACHINE.
(Application filed Sept. 22, 1900.)
(No Model.) 6 Sheets—Sheet 3.

Witnesses.
Albert E. Hill.
William Hadlet.

Inventor.
Edwin Hancox

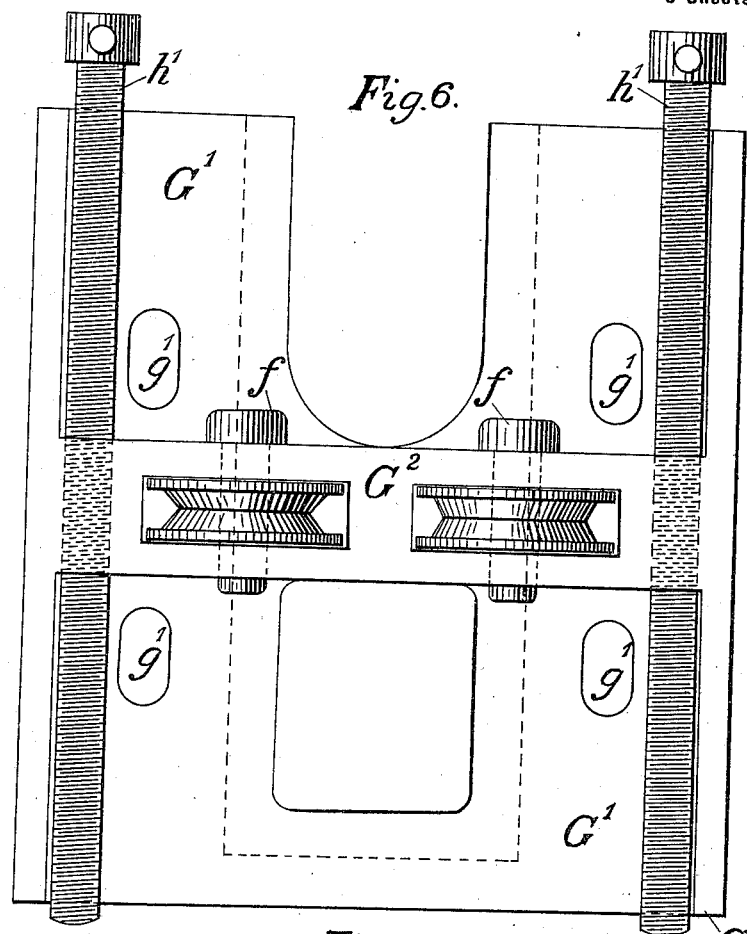
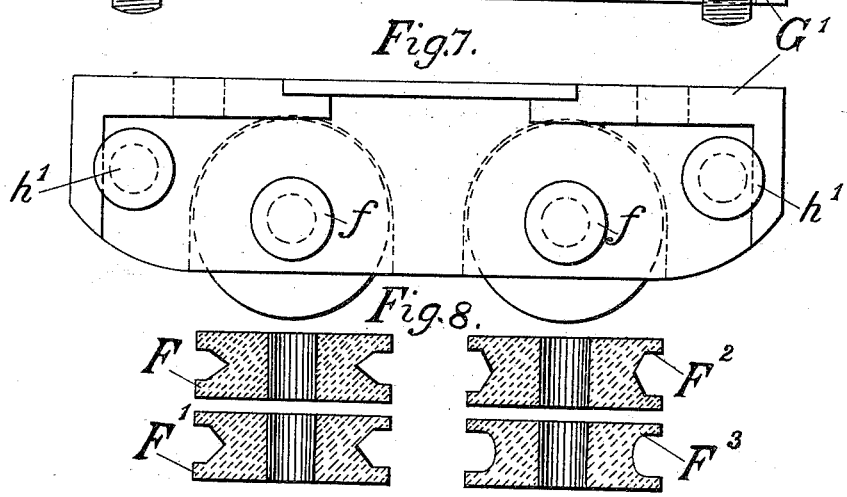
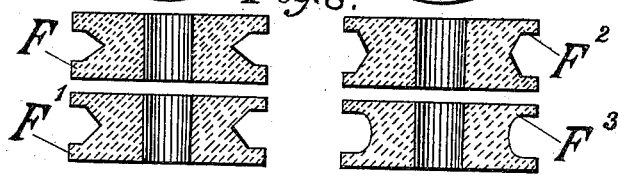

No. 668,330. Patented Feb. 19, 1901.
E. HANCOX.
PIPE MAKING MACHINE.
(Application filed Sept. 22, 1900.)
(No Model.) 6 Sheets—Sheet 5.

Witnesses.
Albert E. Hill.
William Hadlet.

Inventor.
Edwin Hancox

UNITED STATES PATENT OFFICE.

EDWIN HANCOX, OF STOCKTON-ON-TEES, ENGLAND.

PIPE-MAKING MACHINE.

SPECIFICATION forming part of Letters Patent No. 668,330, dated February 19, 1901.

Application filed September 22, 1900. Serial No. 30,873. (No model.)

*To all whom it may concern:*

Be it known that I, EDWIN HANCOX, a subject of Her Majesty Queen Victoria, residing at 8 Dixon street, Stockton-on-Tees, in the county of Durham, England, have invented a new and useful Pipe-Making Machine, of which the following is a specification.

This invention relates to the manufacture of rivetless pipes from metal plates the longitudinal edges of which are upset into a dovetail or approximately dovetail shape. The plates are then bent into an arc of a circle and are joined together so as to produce a pipe by closing down upon their upset or thickened edges the sides of a locking bar or bars of H-section.

The present invention consists in the peculiar construction and arrangement of machinery or apparatus hereinafter described, whereby the longitudinal edges of said plates are upset or thickened into a dovetail or approximately dovetail shape.

In order that my invention may be fully understood, I will now describe the same with reference to the annexed drawings, wherein—

Figure 5:
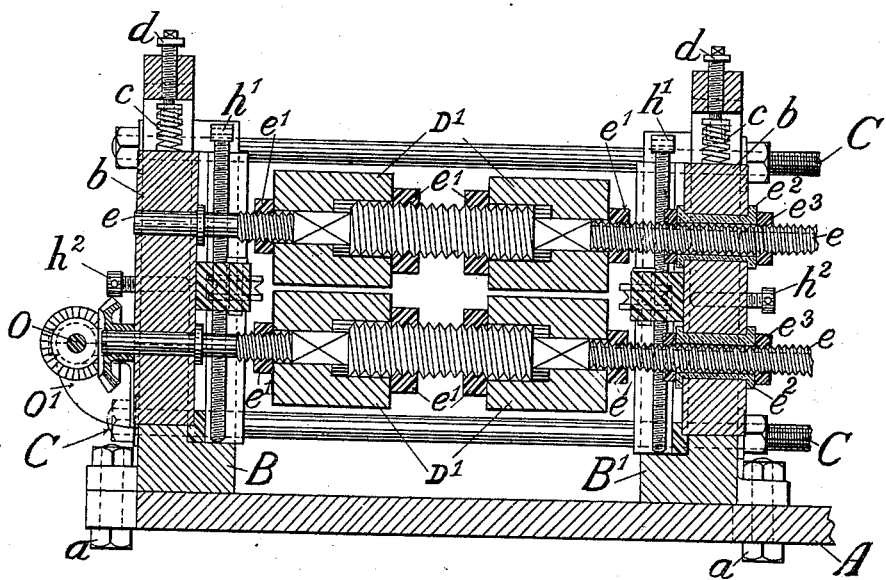

Figures 1 and 2 are plans of a machine for the purpose set forth constructed in accordance with my invention. Figs. 3 and 4 are side elevations of Figs. 1 and 2. Fig. 5 is a transverse vertical section on line $x\,x$, Fig. 1. Figs. 6 to 13 are details hereinafter referred to.

Similar letters refer to like parts in all the figures.

A is the bed-plate or base of the machine, and B B' are castings forming the side frames thereof and secured to the bed-plate A by the bolts $a$. These side frames are adjustable toward and from one another to suit different widths of plates to be treated, and in the drawings the side B' is represented as being adjustable, its holding-down bolts $a$ passing through slots $a'$, which extend transversely of the bed-plate.

C C are stout screw-bolts which hold the frames firmly together and resist the stresses they undergo when the machine is at work.

D D and D' D' are a series of pairs of feed-rollers, each roller of each pair being divided transversely or made in sections, so that the width of the rollers may be varied to suit that of the plate operated upon. The construction of these rollers will be hereinafter described.

$b$ indicates the bearing blocks or brasses for the roller-shafts, which slide within vertical slots formed in the side frames B B' and are kept pressed together by the springs $c$ and regulating-screws $d$. The function of these rollers D and D' is to feed forward the plate to be operated upon first between the planing-tools E and then between the upsetting-rollers F F' F² F³. Provision is made for fine lateral adjustment of the planing-tools and also for lateral and vertical adjustment of the upsetting-rollers, as will hereinafter be described.

I will now describe fully the construction and arrangement of the feed-rollers D, which draw the plate between the planing-tools E, and also of the feed-rollers D', which draw it between the upsetting-rollers. In each the object is simply to make provision for finely adjusting the length over all of the rollers, and although in the drawings the constructional details of the rollers D slightly differ from those of the rollers D' a similar construction might well be adopted in both cases.

Referring to the rollers D, the same slide freely on the screw-threaded shafts $e$, with which they are caused to rotate by a slot and feather and upon which they are adjusted and fixed in the desired position by the nuts $e'$. The rollers D' are adjusted in a similar manner as to their length by means of locknuts $e'$ and are caused to rotate with the shafts $e$ by making portions of the latter of rectangular section, as seen in Figs. 1, 2, and 5. $e^2$ indicates sleeves slipped on the shafts $e$ and caused to revolve therewith by a slot and feather, said sleeves fitting the bearings on the adjustable side B' of the machine. $e^3$ indicates lock-nuts for fixing these sleeves in the desired position. The rollers are driven by bevel-gear from the shaft O, mounted in the bearings O', secured to the side frame B.

I will now describe the mounting of the planing-tools and the means for adjusting them laterally.

Figure 9:
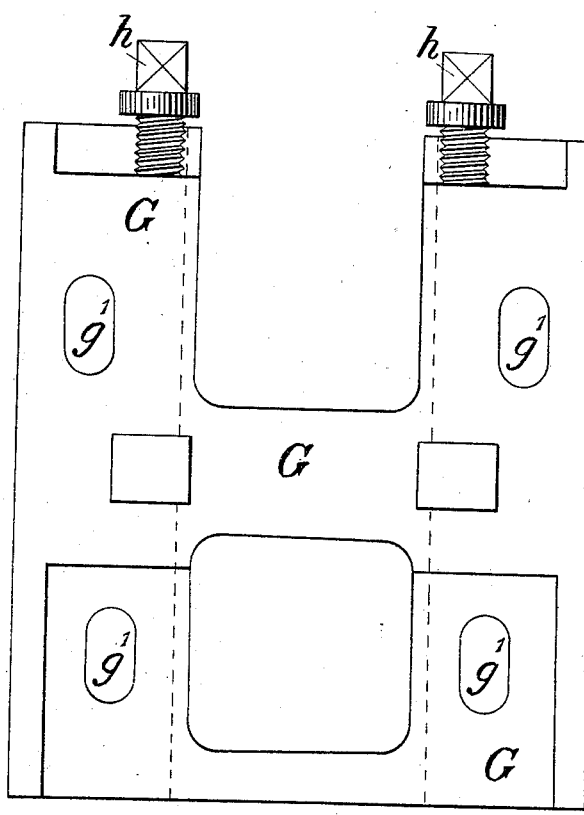
Figure 10:
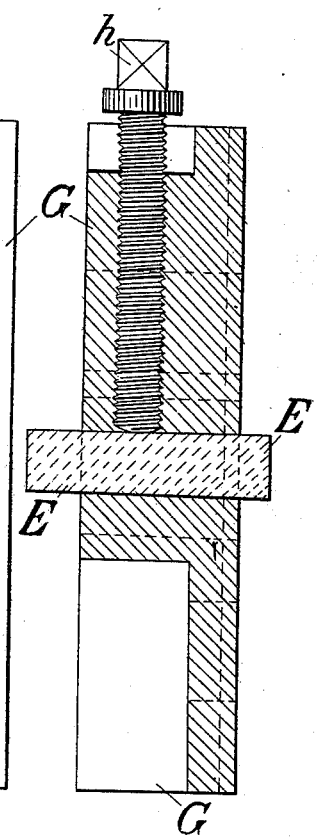
Figure 11:
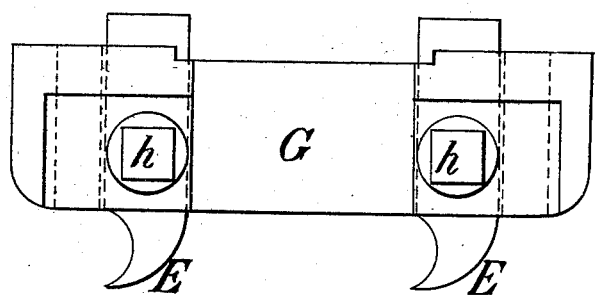

G G, Figs. 9, 10, and 11, are carriers which fit within recesses in the side frames B B' and are held therein by the bolts $g$, which pass through the slots $g'$. Vertical adjustment can thus be effected on loosening said bolts. The tools E pass through holes in the carrier G and are adjustably secured therein by the screws $h$. The rear ends of the tools E project through apertures in the side frames B B', so that lateral adjustment of the tools may readily be effected on loosening the screws $h$. Each tool E should be set slightly in advance of that preceding it, so that successive cuts will be taken off the edges of the plate till sufficiently reduced.

The upsetting-rollers F F' $F^2$ $F^3$ have circumferential grooves varying in width and section, as shown in Fig. 8. The plate is first operated on by the rollers F, the grooves of which are slightly wider than the plate edges. The rollers F' then come into operation, which have grooves of similar section, but slightly wider and of a more obtuse angle, so as to admit and take on the partly-upset edges. The grooves of the next rollers $F^2$ are again somewhat wider and of a more obtuse angle than F', and the grooves of the finishing-rollers $F^3$ are somewhat wider than $F^2$ and slightly curved at the bottom. These finishing-rollers have very little upsetting action, but give a smooth rounded finish to the side edges. I will now describe the manner of mounting these rollers whereby both lateral and vertical adjustment may be readily effected to a nicety.

G', Figs. 6 and 7, indicates carriers fitting recesses in the side frames B B' and secured therein by bolts $g$ in a similar manner to the carriers G, before described. The upsetting-rollers F F' $F^2$ $F^3$ are mounted on the pivots $f$ within recesses in a web $G^2$, formed on the carrier.

$h'$ indicates adjusting-screws threaded in the web $G^2$ and bearing with their lower ends on the side frames B B', Fig. 5. $h^2$ indicates adjusting-screws threaded in the side frames aforesaid and bearing on the backs of the carriers G'. On slackening the nuts $g$ fine adjustment of the carriers G', which carry the upsetting-rollers, may be effected both laterally and vertically by means of the adjusting-screws $h'$ $h^2$, respectively.

Figure 12:
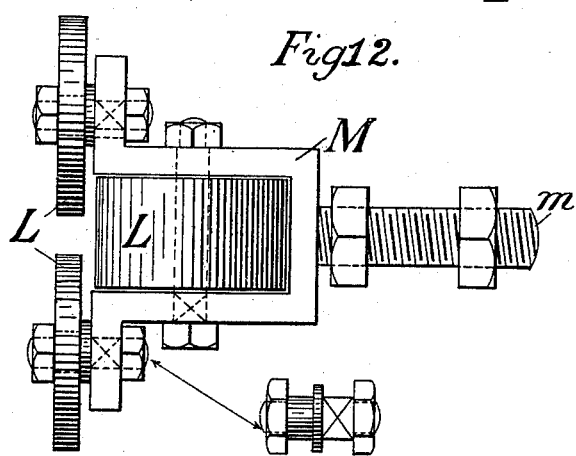
Figure 13:
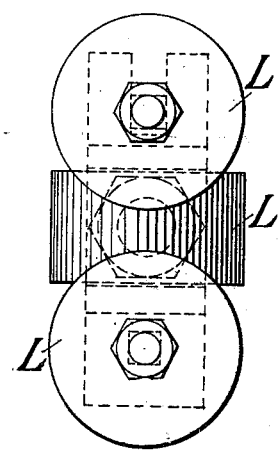

The plate when under treatment by the planing-tools E is supported and guided outside the feed-rollers D by the rollers L L', Figs. 12 and 13, which bear against the upper and lower and side edges, respectively. These rollers are mounted in brackets M, which are fixed to the side frames B B' by the screw-stem $m$ and lock-nuts carried thereby. The function of these rollers L L' is merely, as above stated, to guide and support the plate between the planing-tools, upon which plate they have no other action whatever.

The operation of the machine is as follows: The side frame B' is roughly adjusted to suit the width of the plate to be treated by loosening its holding-down bolts $a$ and also the lock-nuts $e^3$, which fix the sleeves $e^2$ in position on the feed-roller shafts $e$. The width or length of the feed-rollers D D' is also regulated, as before described, so that only those portions of the plate to be upset will project on either side thereof, by means of the nuts $e'$. Fine adjustment of the planing-tools E and upsetting-rollers is then effected, as before explained. The plate to be treated is inserted between the rollers L L' at the right-hand end of the machine and drawn by the feed-rollers D D' successively between the several pairs of planing and upsetting tools, its edges being first planed and then gradually upset during its transit.

Having now particularly described and ascertained the nature of the said invention and in what manner the same is to be performed, I declare that what I claim is—

1. In machinery or apparatus for the purpose set forth, a series of pairs of feed-rollers D D' adjustable as to their length, in combination with a series of pairs of planing-tools and upsetting-rollers, between which the plate to be treated is drawn by the feed-rollers, each pair of planing-tools and upsetting-rollers being adjustable toward and from one another, whereby plates of different widths may be operated upon, substantially as described.

2. In machinery or apparatus for the purpose set forth, the combination of a bed-plate or base, side frames carried thereby and adjustable as to their width apart, upsetting-rollers carried by said side frames, means for adjusting said rollers vertically, and feed-rollers of adjustable length, journaled in bearings in said side frames, whereby the edges of the plate are drawn between the upsetting-rollers, substantially as described.

3. In machinery or apparatus for the purpose set forth, the combination of a bed-plate, side frames carried thereby and movable toward and from one another, tool-carriers G G' adjustable both vertically and laterally in said frames, and carrying respectively planing-tools and upsetting-rollers, and feed-rollers D D', whereby the plate is drawn first between the planing-tools and then between the upsetting-rollers, substantially as described.

4. In machinery or apparatus for the purpose set forth, the employment of feed-rollers D D', each composed of roller-sections, adjustable longitudinally of a screw-threaded shaft by lock-nuts $e'$, in combination with tools for imparting the desired upset shape to the plate edges, which are drawn between said tools by feed-rollers, the carriers of opposite tools being adjustable toward and from one another, substantially as described.

In testimony whereof I have signed my name to this specification in the presence of two subscribing witnesses.

EDWIN HANCOX.

Witnesses:
T. W. MALKIN,
GEO. APPLEBY.